Jan. 1, 1924
J. A. SIMONS
VEHICLE BODY
Filed Aug. 25 1922
1,479,258
4 Sheets-Sheet 2
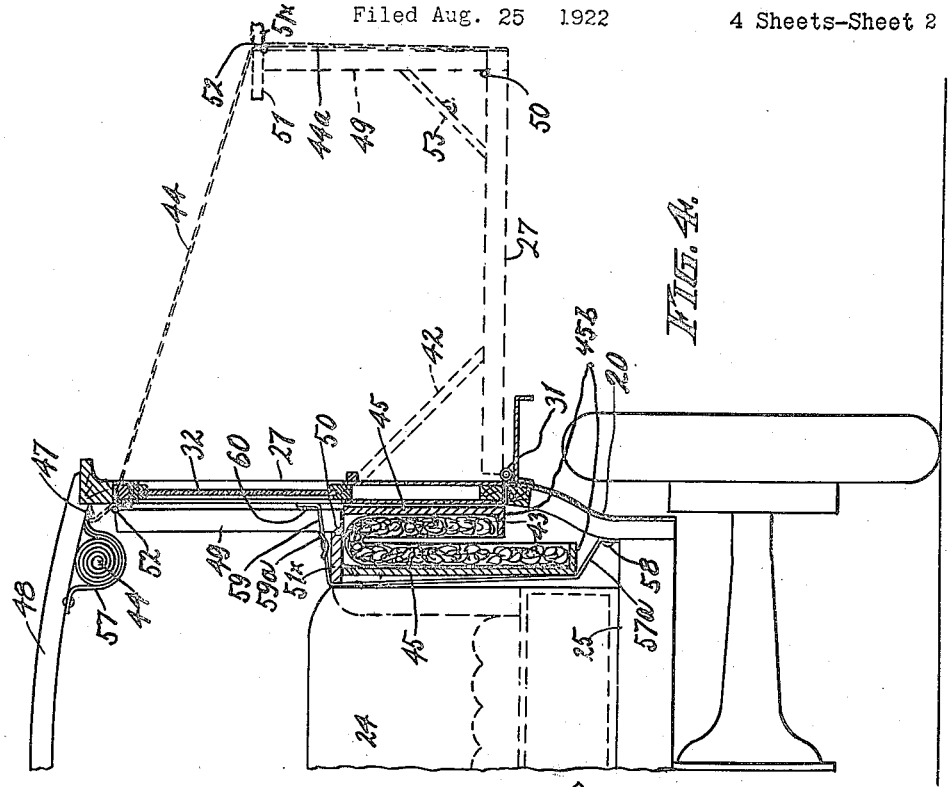
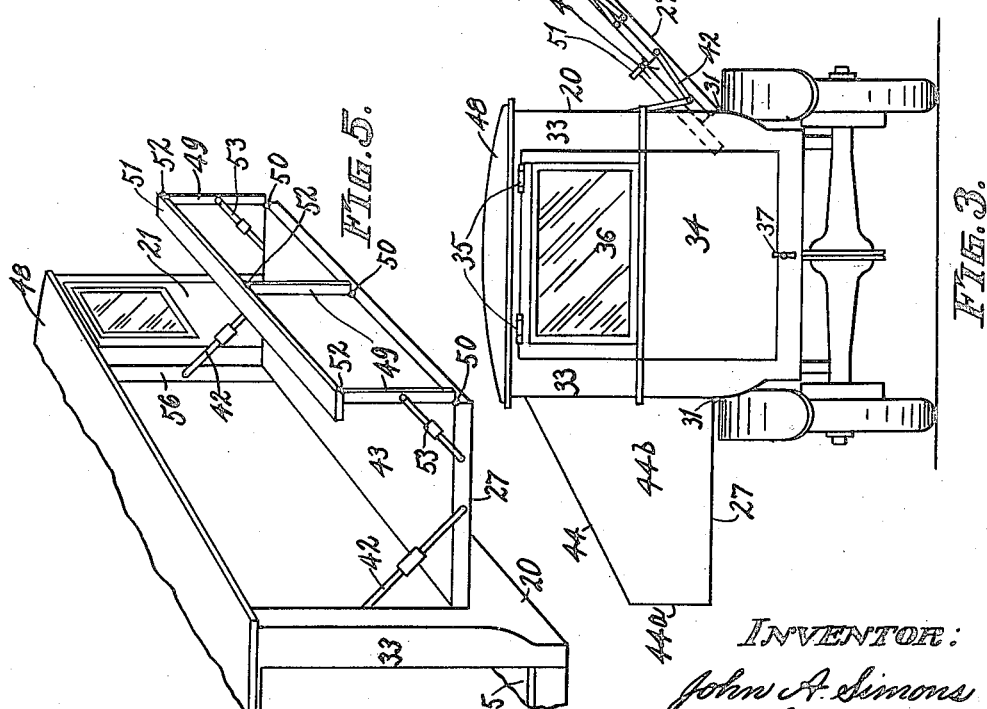
INVENTOR:
John A. Simons
BY H. M. Carlsen
ATTORNEY.

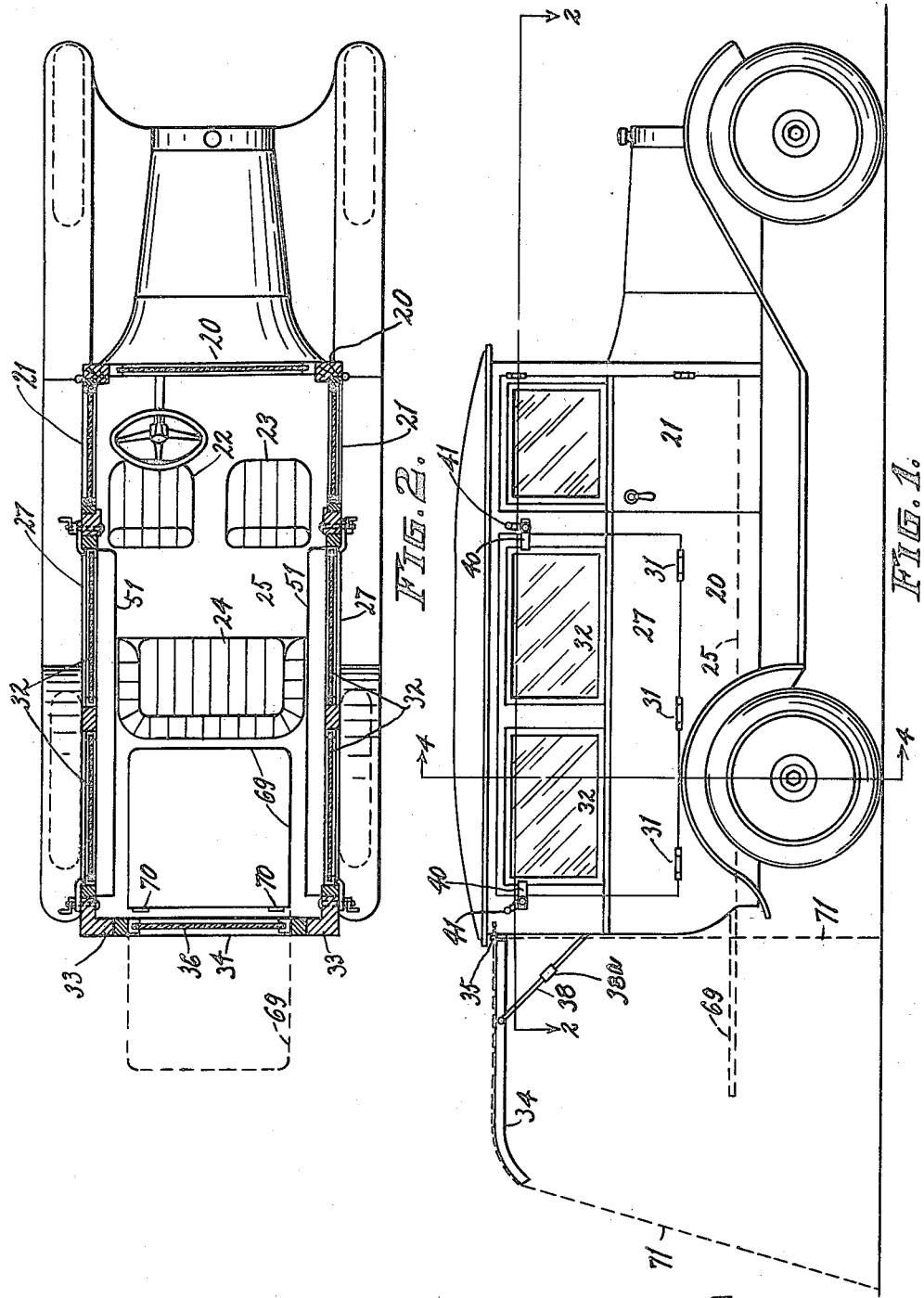

Jan. 1, 1924. 1,479,258
J. A. SIMONS
VEHICLE BODY
Filed Aug. 25, 1922 4 Sheets-Sheet 3
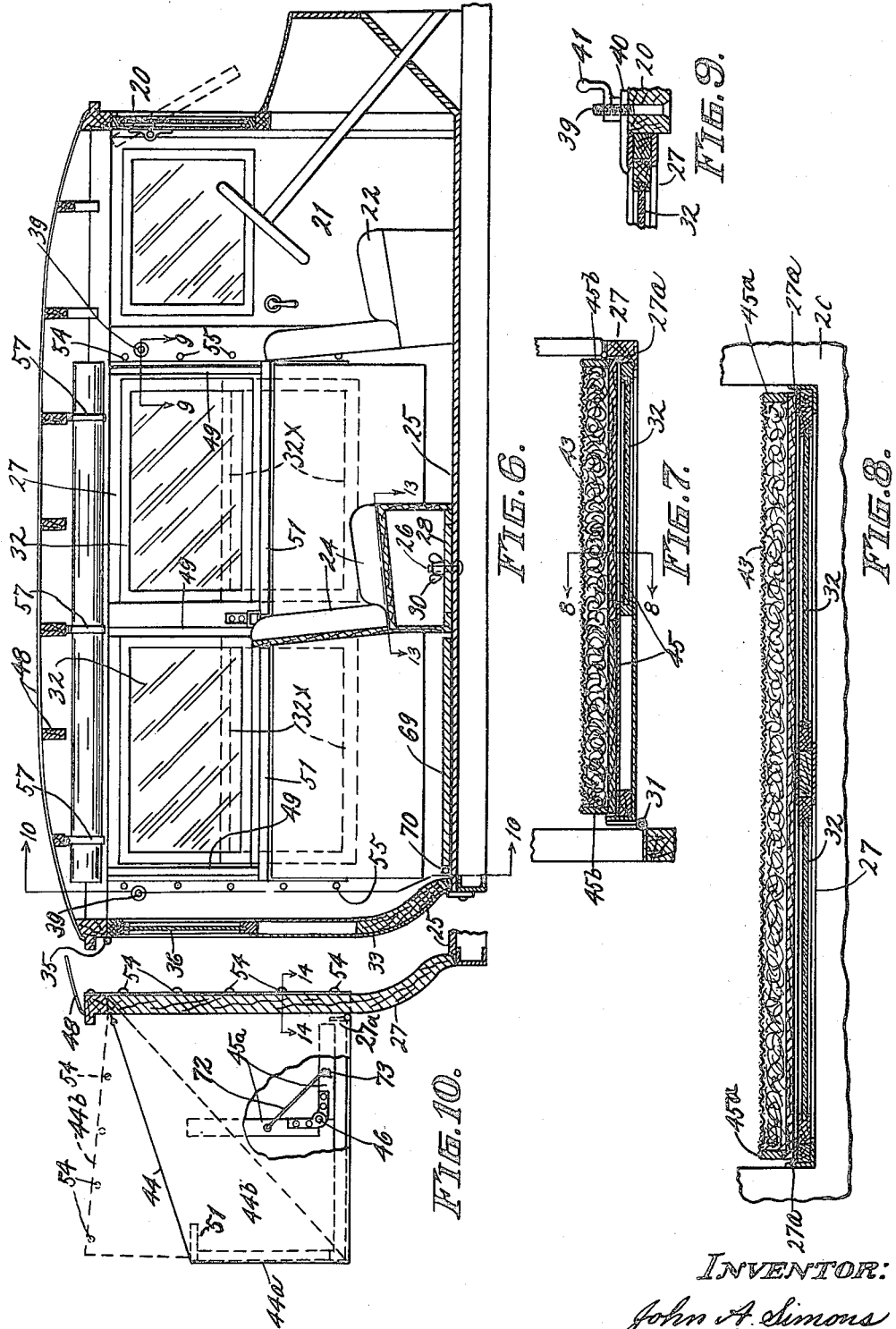

Jan. 1, 1924
1,479,258
J. A. SIMONS
VEHICLE BODY
Filed Aug. 25, 1922
4 Sheets-Sheet 4
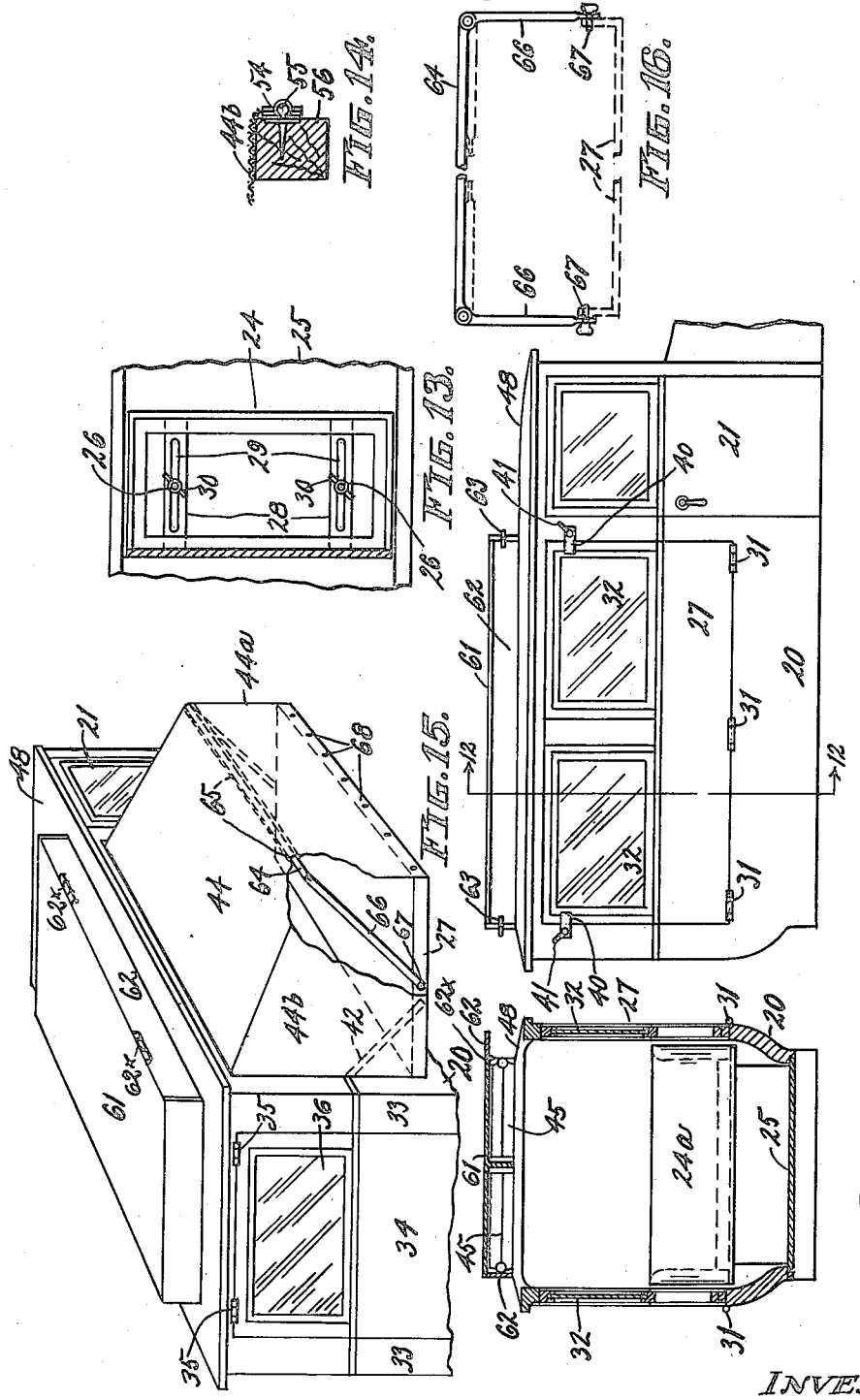

Patented Jan. 1, 1924.

1,479,258

UNITED STATES PATENT OFFICE.

JOHN A. SIMONS, OF MONTEVIDEO, MINNESOTA.

VEHICLE BODY.

Application filed August 25, 1922. Serial No. 584,318.

*To all whom it may concern:*

Be it known that I, JOHN A. SIMONS, a citizen of the United States, residing at Montevideo, in the county of Chippewa and State of Minnesota, have invented certain new and useful Improvements in Vehicle Bodies, of which the following is a specification.

My invention relates to vehicle bodies, particularly a body for motor driven vehicles of the inclosed type commonly known as "sedans." The object is to provide a body which appears and is used the same as any automobile for touring, etc., but which is readily convertible into a car providing sleeping and eating quarters for the occupants without exposure to the elements.

In the accompanying drawings;

Fig. 1 is a right hand side view of my improved vehicle body mounted on an automobile chassis, and its rear end door in open position.

Fig. 2 is a sectional top view as on line 2—2 in Fig. 1 but with the rear end door closed.

Fig. 3 is a rear elevation of Fig. 1 with the rear end door closed, one bed section partly unfolded and the other bed section fully unfolded into operative position.

Fig. 4 is an enlarged sectional elevation of the right hand side of the car body as on line 4—4 in Fig. 1 and Fig. 5 is a right hand rear perspective view of the body illustrated in Fig. 1 but with the bed frame unfolded and its canvas cover omitted.

Fig. 6 is an enlarged, longitudinal, sectional elevation of the left side of the vehicle body.

Fig. 7 is an enlarged cross section of either bed section and Fig. 8 is a longitudinal section on line 8—8 in Fig. 7.

Fig. 9 is an enlarged detail as on line 9—9 in Fig. 6.

Fig. 10 is a section as on line 10—10 in Fig. 6 but with the bed section unfolded and some details omitted.

Fig. 11 is a modification of Fig. 1 with the auto chassis omitted.

Fig. 12 is a sectional elevation on line 12—12 in Fig. 11.

Fig. 13 is a detail, sectional view as on line 13—13 in Fig. 6.

Fig. 14 is an enlarged sectional view on line 14—14 in Fig. 10.

Fig. 15 is a right hand rear perspective view of the upper portion of Fig. 11 and with the right hand bed section in operative position.

Fig. 16 is an enlarged detail of the canvas frame bar 66 in Fig. 15.

Referring to the drawing by reference numerals, my improved vehicle body is built in a manner to closely resemble a "sedan" or inclosed type automobile body 20 having the usual front exit doors 21 to the right and the left of the driver's seat 22 and adjacent front seat 23. Another seat 24 is adjustably secured to the floor 25 back of the driver's seat, the adjustment comprising preferably, vertically disposed bolts 26 in the floor 25 of the body (see Fig. 13); said bolts slidable longitudinally with relation to the auto body, in boards 28 which are integral with the seat 24 and slotted as at 29. Each bolt has a thumb nut 30 bearing upon the strip 28 to hold the seat in any desired spaced relation to the driver's seat.

It is well known that in many of the inclosed type of autos there are opposite side doors adjacent the rear seat and also one or more windows in the side walls and usually another window in the center of the rear wall. In my improved body construction each side wall, back of the front doors, has a rectangular section 27 (see Fig. 1) hinged as at 31 at its lower horizontal edge. Each of these sections is of hollow construction comprising two spaced walls preferably of sheet metal, their upper portions being provided with openings normally occupied by windows 32 which may be dropped into the lower portion to approximately the position 32× indicated in dotted lines in Fig. 6.

The rear wall 33 is also of hollow construction containing a vertically swingable door 34 hinged at its top as at 35 in Figs. 1, 3 and 6, and said door is of a construction similar to the hinged side sections and has a drop window 36. The side windows 32 and rear window are held at any desired height by any suitable means (not shown).

Any suitable means such as a pawl 37 (see Fig. 3) may be used to hold the rear door 34 in closed position and a foldable knee brace 38 is attached with one end to the door 34 and its other end in the adjacent wall 33 and has a sleeve 38ᵃ adapted to be slipped over the joint of the brace (see Fig. 1) to hold the latter in a straight line and support the door outwardly in horizontal position for a purpose to be described.

The hinged side sections 27 are each preferably held vertically in plane with its side wall 20 by clamping members secured to the wall adjacent the vertical edges of said hinged section (see detail Fig. 9) and comprising a pivot bolt 39 on which is loosely pivoted a clamp 40. A nut having a hand lever 41 is threaded on the bolt and adapted to secure the clamp 40 in engaged position with the hinged wall section. By releasing and turning the clamping members 40 each side section may be swung down to horizontal position and held thus by a knee brace 42 at each end thereof. Either or both of the oppositely disposed wall members, when thus swung down, form convenient sleeping quarters by placing a foldable mattress 43 on each of them and arranging a waterproof covering 44 (see Figs. 4 and 15) over each bed thus provided, as will now be further explained.

Each bed section is preferably a rectangular elongated frame comprising two bottom boards 45 (see Figs. 7 and 10) and four vertically disposed boards, namely two transverse boards 45$^a$ and two longitudinal boards 45$^b$, on the upper edges of which are secured the edges of a mattress 43. Said boards 45$^a$ are hinged as at 46 (Fig. 10) allowing the frame and mattress to be folded up as in Figs. 3 and 4. Ledges 27$^a$ (Figs. 7 and 8) may be provided in the wall sections 27 and adjacent the window to support the mattress frame and prevent breaking of the windows 32.

In Figs. 3, 4, 10 and 15 I have illustrated the waterproof covering 44—44$^a$ preferably made of canvas and resembling one half of a wall tent for covering each bed. The upper longitudinal edge of such cover is secured as at 47 (in Fig. 4) to the roof 48. The canvas wall portion 44$^a$ is preferably supported by a skeleton frame comprising posts 49, hinged as at 50 in Fig. 5, to the upper edge of the wall sections 27 and a rail 51 is hingedly secured as at 52 to the upper ends of said posts (see Figs. 4 and 5) and thus forming with them a rectangular frame the full length of the bed. Knee braces 53 are used at both ends of said frame to hold it in vertical position. The canvas covering comprises a roof 44, side wall 44$^a$ and has end walls or flaps 44$^b$ (see left side in Fig. 3) the latter having each a row of friction snaps 54 of the glove button type (see Fig. 10) along its vertical inner edge and adapted to engage a vertical row of correspondingly spaced button heads 55 in the vertical side wall frame posts 56 adjacent the opening for the folding wall sections 27 (see Figs. 6, 10 and 14) and the canvas is thus held taut over the frame.

When the canvas is not in use its end flaps 44$^b$ may be folded back on the roof portion of it and the whole cover rolled up toward its upper edge, under the roof, where the roll may be secured as by a number of straps 57 (see Figs. 4 and 6). After rolling up the canvas the mattress is folded up toward the center of the car, then the wall frame portion 49—51 is folded down, the rail 51 of the latter meantime being turned back on its hinge (as at 51$^x$) and the whole side wall section is raised to vertical position and locked as previously described by the levers 41 and clamps 40. This operation brings the folding bed portion to the vertical position shown in Fig. 4, one of the bottom boards 45 of the folding mattress being innermost, and the board 51 resting on top of it in a horizontal plane and forming a ledge just between the window and the seats. A strap 57$^a$ secured to the wall, near the floor as at 58, is passed upwardly and thence over the top of the rail 51 and connected with a buckle 59$^a$ of another strap 59 suitably secured as at 60 between the windows 32 (see Fig. 4) to hold the bed section securely in place.

In the modifications, Figs. 11, 12 and 15, the canvas 44 is rolled up in the manner above described, but I provide a housing 61 upon the roof of the auto having side members 62 hinged at 62$^x$ and held closed by catches 63. This housing is large enough to hold the two mattresses 45 permitting a wider seat 24$^a$ to be used in the car (see Fig. 12). With this construction the frame 49—51 is of course not needed but I provide a substitute for such frame as illustrated in Figs. 15 and 16 in which; 64 is a straight bar adapted to be slipped into a pocket 65 in the canvas, 66 are depending bars hingedly secured to the opposite ends of bar 64, their lower ends adapted to pivotally engage the ends of the wall members 27 as at 67 in Figs. 15 and 16 with the bars arranged angularly as shown. The bar 64 thus replaces the rail 51 of the former construction and the lower edge of the canvas (below bar 64) may be provided with snaps 68 to engage button heads (not shown) on the outer edge of the folding wall.

69, in Figs. 1, 2 and 6, is a folding table hinged as at 70 to the floor near the rear door and can be folded out to about the horizontal position indicated by dotted line 69 in Figs. 1 and 2 when the rear door is open. This provides a convenient table protected from sun and rain by the horizontally extended rear door 34 and for inclement weather a canvas 71 (shown dotted in Fig. 1) of any suitable proportions may be thrown over the door 34 and secured to the ground in any suitable manner to protect persons sitting around the table 69 either on the ground or on suitable camping chairs (not shown).

For further convenience I provide, at the ends of the mattress frames a long shanked screw hook 72 pivoted in one mattress member and adapted to engage an eye screw 73 in the other member (see Fig. 10) in such a manner as to hold the foldable mattress sections at right angles, thus forming two elongated seats, each with a back rest, within the car and under the shelter of the canvas roofs 44. Occupants may thus be seated facing each other.

In the above description the construction as well as the usefulness of my improved vehicle body is quite fully disclosed. It may be added, however, that this invention is what may be termed a self-contained touring and camping automobile body. Practically all the unpleasant features of camping are eliminated in as much as the car contains the sleeping accommodations and the arrangement within the car permits meals to be cooked and eaten under roof when so desired.

It is readily seen that an automobile with my improvements embodied in it can be made in such a manner as not to detract from its outside appearance as a so-called "sedan."

It will be further understood that all the auto seats 22—23—24 may be removable permitting a table to be placed in the center of the car and the occupants may be seated on both sides thereof, using the mattresses as seats (as previously described). Such table (not shown) may be set on the floor of the auto or suspended from the ceiling.

What I claim is;

1. A car of the class described having hinged side sections each adapted to be folded out and held in horizontal position, a mattress adapted to rest on each of said sections, said mattress being framed and the frame being foldable longitudinally to about right angles so as to make about half of the mattress form a seat and the other half a back rest for the seat and means for holding the said back rest in raised position.

2. The structure specified in claim 1, said hinged side sections having each when in closed position windows in the upper portion, and a mattress adapted to cover the whole wall section when the latter is unfolded, but the mattress being foldable upon itself so as to expose the windows when the section is in closed position.

3. The structure specified in claim 2, said mattress having a foldable frame with a solid bottom a portion of which presents a solid wall surface in the car when the wall section is closed.

4. The structure specified in claim 3, said hinged side section having upon its outer edge, when in horizontal position, a vertical frame adapted to support a detachable canvas roof and walls; said frame being hinged to fold inward upon the section and having means for holding it in vertical position; said frame having its upper edge formed of a flat rail so hinged to the frame that it may swing to horizontal position in opposite directions, in one direction supporting the canvas roof and in the other direction forming a cover over the top edge of the folded mattress and a window sill below the windows in the hinged wall section.

In testimony whereof I affix my signature.

JOHN A. SIMONS.